US011113607B2

(12) United States Patent
Miyoshi et al.

(10) Patent No.: US 11,113,607 B2
(45) Date of Patent: Sep. 7, 2021

(54) COMPUTER AND RESPONSE GENERATION METHOD

(71) Applicant: HITACHI, LTD., Tokyo (JP)

(72) Inventors: Toshinori Miyoshi, Tokyo (JP); Miaomei Lei, Tokyo (JP); Hiroki Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 915 days.

(21) Appl. No.: 15/616,370

(22) Filed: Jun. 7, 2017

(65) Prior Publication Data

US 2018/0068225 A1 Mar. 8, 2018

(30) Foreign Application Priority Data

Sep. 8, 2016 (JP) ............................. JP2016-175853

(51) Int. Cl.
*G06N 5/02* (2006.01)
*G06F 16/901* (2019.01)
*G06F 16/903* (2019.01)

(52) U.S. Cl.
CPC ......... *G06N 5/022* (2013.01); *G06F 16/9024* (2019.01); *G06F 16/90335* (2019.01)

(58) Field of Classification Search
CPC ................ G06N 5/022; G06F 16/9024; G06F 16/90335
See application file for complete search history.

(56) References Cited

U.S. PATENT DOCUMENTS

| 6,718,304 | B1* | 4/2004 | Tachimori | G01C 21/3667 |
| | | | | 704/236 |
| 9,842,166 | B1* | 12/2017 | Leviathan | G06F 16/9024 |
| 2002/0107844 | A1* | 8/2002 | Cha | G06F 16/3344 |
| 2005/0154690 | A1* | 7/2005 | Nitta | G06F 16/30 |
| | | | | 706/46 |

(Continued)

FOREIGN PATENT DOCUMENTS

| JP | 2003-228580 A | 8/2003 |
| WO | 2016/067334 A1 | 5/2016 |

OTHER PUBLICATIONS

Japanese Office Action dated Jul. 30, 2019 for the Japanese Patent Application No. 2016-175853.

*Primary Examiner* — Kamran Afshar
*Assistant Examiner* — Imad Kassim
(74) *Attorney, Agent, or Firm* — Volpe Koenig

(57) ABSTRACT

A response generation apparatus ensures accurate output. A computer stores graph knowledge including a response generation module generating a response to an input document including a plurality of sentences, the graph knowledge database includes graph data that manages a structure of each type of graph knowledge, and the response generation module generates a first graph knowledge from each of the sentences; searches a second graph knowledge similar to each of the plurality of first graph knowledge while referring to the graph data on the basis of the plurality of first graph knowledge; identifies the plurality of second graph knowledge included in a dense location where a density of the second graph knowledge is high in a graph space; searches third graph knowledge for generating the response while referring to the graph data on the basis of the identified second graph knowledge; and generates the response using the third graph knowledge.

14 Claims, 9 Drawing Sheets

(56) References Cited

U.S. PATENT DOCUMENTS

| | | | | |
|---|---|---|---|---|
| 2009/0254543 | A1* | 10/2009 | Ber | G06F 16/907 |
| 2015/0019589 | A1* | 1/2015 | Arroyo | G06F 16/245 707/779 |
| 2015/0169758 | A1* | 6/2015 | Assom | G06F 16/36 707/603 |
| 2015/0269231 | A1* | 9/2015 | Huynh | G06F 16/951 707/722 |
| 2016/0012058 | A1* | 1/2016 | Franceschini | G06F 16/338 707/728 |
| 2017/0169133 | A1* | 6/2017 | Kim | G06F 16/2237 |
| 2017/0243107 | A1* | 8/2017 | Jolley | G06N 3/006 |
| 2017/0270124 | A1* | 9/2017 | Nagano | G06N 5/022 |
| 2018/0039696 | A1* | 2/2018 | Zhai | G06F 16/367 |
| 2018/0053099 | A1* | 2/2018 | Beller | G06F 16/90335 |
| 2018/0108066 | A1* | 4/2018 | Kale | G06F 16/532 |
| 2018/0157744 | A1* | 6/2018 | Chen | G06F 16/313 |

* cited by examiner

FIG.5

500 GRAPH DATA

510

| NODE ID (511) | ENTITY ID (512) | ENTITY TYPE (513) | CHARACTER STRING (514) |
|---|---|---|---|
| 081223 | E00382 | OTHERS | casino |
| 521823 | E02283 | P | tax revenue, government revenue |
| ⋮ | ⋮ | ⋮ | ⋮ |

520

| NODE ID (521) | RELATION ID (522) | RELATION TYPE (523) | CHARACTER STRING (524) |
|---|---|---|---|
| 881222 | R00532 | promote | generate |
| 182321 | R00532 | promote | generate |
| ⋮ | ⋮ | ⋮ | ⋮ |

530

| EDGE ID (531) | EDGE TYPE (532) | SOURCE NODE ID (533) | TARGET NODE ID (534) |
|---|---|---|---|
| 001282 | T00001 | 081223 | 881222 |
| 800182 | T00001 | 881222 | 521823 |
| ⋮ | ⋮ | ⋮ | ⋮ |

FIG.6

600 ATTRIBUTE DATA

| NODE ID (611) | ENTITY ID (612) | ATTRIBUTE (613) | | | 610 |
|---|---|---|---|---|---|
| | | DOCUMENT ID | SENTENCE ID | ... | |
| 081223 | E00382 | D00128 | S01223 | ... | |
| 081223 | E00382 | D88021 | S88312 | ... | |
| ⋮ | ⋮ | ⋮ | ⋮ | ⋮ | |

| NODE ID (621) | RELATION ID (622) | ATTRIBUTE (623) | | | 620 |
|---|---|---|---|---|---|
| | | DOCUMENT ID | SENTENCE ID | ... | |
| 881222 | R00532 | D00128 | S01223 | ... | |
| 182321 | R00532 | D88021 | S88312 | ... | |
| ⋮ | ⋮ | ⋮ | ⋮ | ⋮ | |

| EDGE ID (631) | EDGE TYPE ID (632) | ATTRIBUTE (633) | | | 630 |
|---|---|---|---|---|---|
| | | DOCUMENT ID | SENTENCE ID | ... | |
| 001282 | T00001 | D00128 | S01223 | ... | |
| 800182 | T00001 | D00128 | S01223 | ... | |
| ⋮ | ⋮ | ⋮ | ⋮ | ⋮ | |

- DIRECT COUNTERARGUMENT

- EXTERNAL INTERVENTION

- TRADEOFF

- EFFECT SUPPRESSION

- ALTERNATIVE

COMPUTER AND RESPONSE GENERATION METHOD

CLAIM OF PRIORITY

The present application claims priority from Japanese patent application JP 2016-175853 filed on Sep. 8, 2016, the content of which is hereby incorporated by reference into this application.

BACKGROUND OF THE INVENTION

1. Field of the Invention

The present invention relates to a technique for generating a response to a user input.

2. Description of the Related Art

As a method of presenting user's demanded information, there is known a system transmits a request to a user to input a keyword such as a word or a phrase and presents documents, webpages, part of documents, photographs, sounds, product information, and the like highly relevant to the input keyword. The aforementioned search method is widely used to extract user's desired information from media information such as a large number of documents and a large number of images. There is also known a search method of searching information including not only an input keyword but also synonyms of the keyword and words highly relevant to the keyword.

As applications of the aforementioned system, there are known a question answering system for answering to a user's question, an interactive system for establishing a dialog with a user, and the like.

WO2016/067334 indicates that "a document search system is provided with a value promotion/suppression table which describes a corresponding relationship between values and events that promote or suppress the values, and determines consistency between an article and the corresponding relationship described by the value promotion/suppression table on the basis of a positive phrase or a negative phrase written by the article with respect to the values and the corresponding relationship."

SUMMARY OF THE INVENTION

It is necessary to accurately grasp an input in order to output an accurate response to the input. Specifically, an apparatus refers to a knowledge database and searches a knowledge that matches the input. However, if the knowledge that matches the input is not stored in the knowledge database, the apparatus is unable to generate a response. As a consequence, no information is presented in response to the input. Furthermore, the conventional technique has a problem that if a matching condition is relaxed, it is impossible to output an accurate response.

A typical example of the invention disclosed in the present application is as follows. That is, provided is a computer including a processor, a storage device connected to the processor, and an interface connected to the processor. Further, the computer holds a graph type knowledge database that stores graph type knowledges each representing a relevance among elements constituting a sentence that defines a knowledge using a node and an edge, and the computer includes a response generation module that generates a response to an input document including a plurality of sentences using the graph type knowledge database. Furthermore, the graph type knowledge database includes graph data that manages a structure of each of the graph type knowledges, and the response generation module is configured to: generate a first graph type knowledge from each of the sentences included in the input document; search a second graph type knowledge similar to each of the plurality of first graph type knowledges while referring to the graph data on the basis of the plurality of first graph type knowledges; identify the plurality of second graph type knowledges included in a dense location where a density of the plurality of second graph type knowledges is high in a graph space corresponding to the graph type knowledge database as the second graph type knowledges used to generate a response; search third graph type knowledges for generating the response while referring to the graph data on the basis of the identified second graph type knowledges; and generate the response using the third graph type knowledges.

According to the present invention, it is possible to always generate a response to an input. Problems other than the aforementioned problem, configurations, and advantages will become further obvious from "DESCRIPTION OF THE PREFERRED EMBODIMENTS" section.

BRIEF DESCRIPTION OF THE DRAWINGS

FIG. 5 shows an example of graph data included in the graph type knowledge DB according to the first embodiment;

FIG. 6 shows an example of attribute data included in the graph type knowledge DB according to the first embodiment;

DESCRIPTION OF THE PREFERRED EMBODIMENTS

Embodiments of the present invention will be described hereinafter with reference to the drawings. Problems that are not discussed in SUMMARY OF THE INVENTION section are as follows.

A debate is conducted while participants individually take a positive stand and a negative stand on a given discussion topic. However, a search is conducted on the basis of the input keyword according to the conventional search method, so that it is difficult to output a viewpoint which a user is unaware of or a response based on the stand different from the stand of the user. Furthermore, with the conventional search method, it is difficult to output a response that might contribute to new ideas. In a case of a debate on a topic that can be discussed from a plurality of perspectives, relevant matters include a plurality of facts, with the result that the conventional question answering system intended at one fact is unable to output an appropriate response.

Embodiment 1

Figure 2:
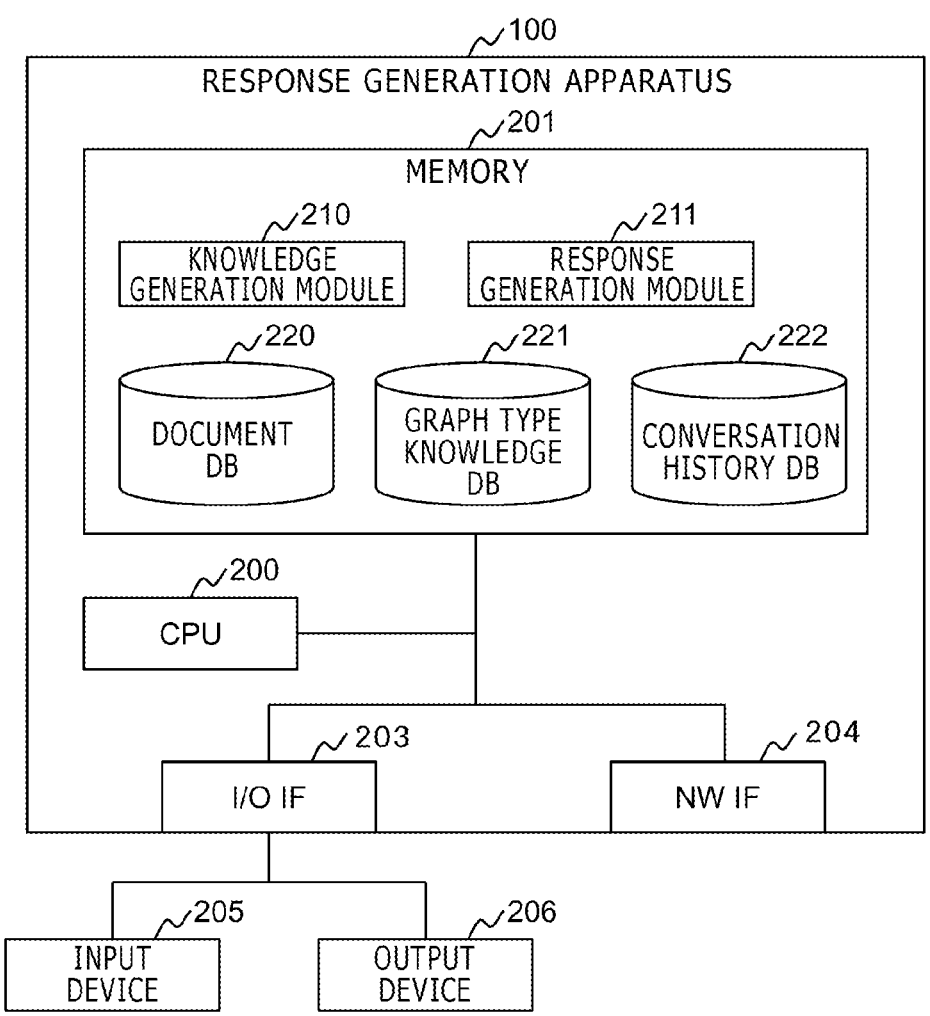
FIG. 2 is a block diagram showing an example of a configuration of the response generation apparatus according to the first embodiment.

FIG. 2 is a block diagram showing an example of a configuration of a response generation apparatus 100 according to a first embodiment. The configuration of the response generation apparatus 100 will first be described with reference to FIG. 2.

The response generation apparatus 100 is an apparatus that generates a counterargument against a user's argument (input), and includes a central processing unit (CPU) 200, a memory 201, an input/output interface (I/O IF) 203, and a network interface (NW IF) 204.

The CPU 200 executes programs stored in the memory 201. Executing the programs by the CPU 200 realizes functions owned by the response generation apparatus 100. In the following description, describing a case in which a module is a subject represents that the CPU 200 executes a program realizing the module.

The memory 201 stores the programs executed by the CPU 200 and information used by the programs. Furthermore, the memory 201 includes a storage area used by the programs. In the present embodiment, the memory 201 stores programs realizing a knowledge generation module 210 and a response generation module 211. The memory 201 also stores a document DB 220, a graph type knowledge DB 221, and a conversation history DB 222. The memory 201 may hold programs and information (not shown).

The knowledge generation module 210 generates the graph type knowledge DB 221 using the document DB 220. The response generation module 211 generates a response to an input document using the graph type knowledge DB 221 and the conversation history DB 222.

The document DB 220 stores document data 300 (see FIG. 3) accumulated as knowledges. The document data 300 is obtained by digitizing a document described in a natural language and serves as a source of knowledges of the present system.

A document herein includes one or more sentences. Examples of the documents in the present embodiment include documents posted on websites, news articles, reports in organizations, academic papers, official bulletins of government and municipal offices and the like, research documents of think tanks. Note that past conversation histories may be also dealt with as documents.

The present embodiment covers not only a knowledge having no change in content/fact depending on an argument stand but also a knowledge changing in content/fact depending on an argument stand.

Examples of the knowledge having no change in fact might include a knowledge "the capital of Japan is Tokyo."

Furthermore, examples of the knowledge changing in fact depending on an argument stand might include a knowledge "casino generate tax revenue." The latter knowledge holds as a fact on a certain stand but does not hold as a fact on a different stand. For example, a knowledge obtained from a case regarding a region Y holds in regions identical in characteristics to the region Y but does not hold in regions different in characteristics. Furthermore, in a case of inferring a present or future knowledge, a knowledge inferred using knowledges obtained from present cases is considered to be more plausible than a knowledge inferred using knowledges obtained from past cases.

Therefore, the response generation apparatus 100 according to the present embodiment selects knowledges to be used in the light of conditions. For example, if a matter concerning the US is input, the response generation apparatus 100 generates a response using knowledges obtained from cases concerning the US.

The graph type knowledge DB 221 stores graphs each indicating a relevance among elements such as words that constitute a sentence. The graph type knowledge DB 221 includes graph data managing a graph structure and attribute data managing attributes of the elements constituting each graph.

The conversation history DB 222 stores past conversation histories. Note that the conversation history DB 222 may be a part of the document DB 220.

The I/O IF 203 is an interface connecting the response generation apparatus 100 to an external device. In the present embodiment, an input device 205 and an output device 206 are connected to the response generation apparatus 100 via the I/O IF 203. The input device 205 is used to input data to the response generation apparatus 100 and examples of the input device 205 include a keyboard, a mouse, and a touch panel. The input device 205 may include a microphone and the like for picking up a sound. A user inputs a command and the like to the response generation apparatus 100 using the input device 205. The output device 206 is used to display a processing result and the like and examples of the output device 206 include a display and a touch panel.

The NW IF 204 is an interface connecting the response generation apparatus 100 to a device via a network.

The response generation apparatus 100 may include a storage device such as an HDD (Hard Disk Drive) and an SSD (Solid State Drive). Alternatively, data may be input or output without using the input device 205 or the output device 206. For example, the data may be input or output using the device connected to the response generation apparatus 100 via the NW IF 204.

While one computer includes the knowledge generation module 210 and the response generation module 211, different computers may include the respective modules. Furthermore, a plurality of computers may be used to execute processes that can be executed in parallel.

Figure 3:
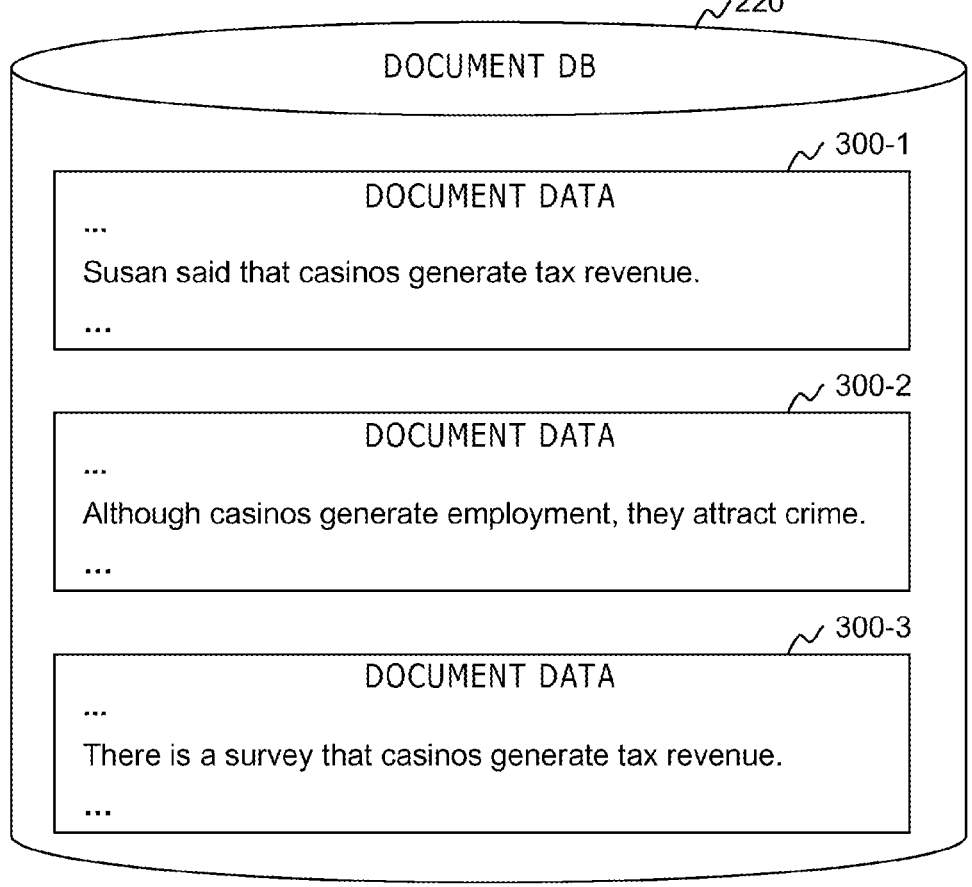
FIG. 3 shows an example of a document DB according to the first embodiment.

FIG. 3 shows an example of the document DB 220 according to the first embodiment.

The document DB 220 stores a plurality of items of document data 300. It is assumed in the present embodiment that one document data 300 is generated from one document.

In the example shown in FIG. 3, three items of document data 300-1, 300-2, and 300-3 are stored in the document DB 220.

Figure 4:
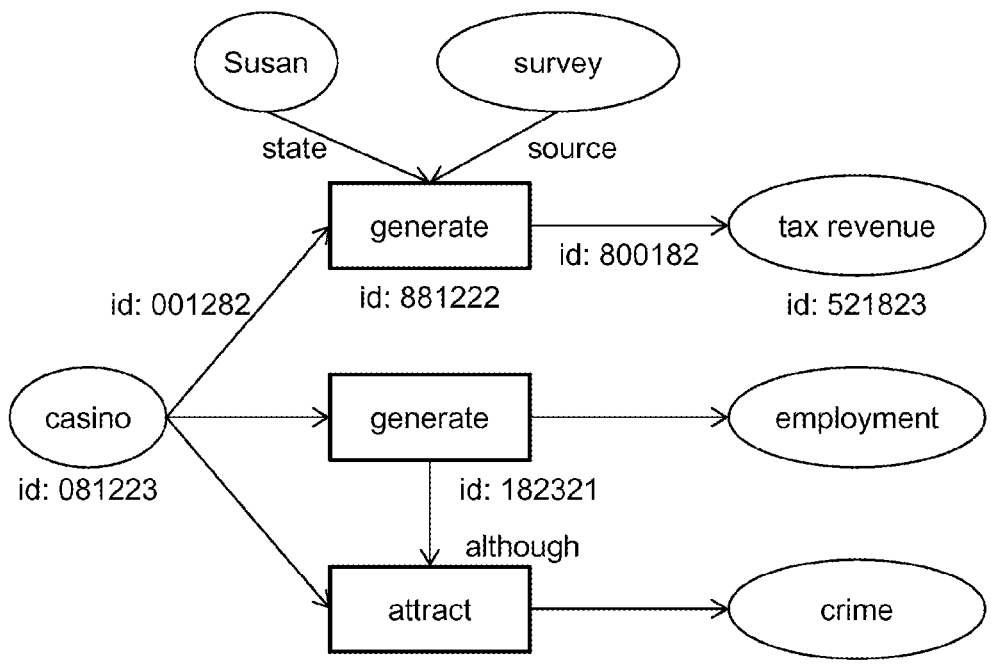
FIG. 4 is a conceptual drawing of a graph type knowledge stored in a graph type knowledge DB according to the first embodiment.

FIG. 4 is a conceptual drawing of a graph type knowledge stored in the graph type knowledge DB 221 according to the first embodiment. FIG. 5 shows an example of graph data 500 included in the graph type knowledge DB 221 according to the first embodiment. FIG. 6 shows an example of attribute data 600 included in the graph type knowledge DB 221 according to the first embodiment.

FIG. 4 shows the graph type knowledge generated from the document data 300-1, 300-2, and 300-3 shown in FIG. 3. The graph type knowledge is configured from nodes and edges connecting the nodes.

In the present embodiment, two types of nodes, i.e., entities and relations are present as the nodes. The entities are nodes each indicating an entity such as a person, an object, and an organization and an abstract idea. In FIG. 4, an oval node represents an entity. The relations are nodes each indicating a relation between/among the entities. In FIG. 4, a rectangular node represents a relation.

IDs are assigned to the respective nodes and edges. In FIG. 4, IDs are assigned to part of the nodes and edges only for the brevity of description.

The graph data 500 includes entity management data 510, relation management data 520, and edge management data 530.

The entity management data 510 is data that manages the entities and includes entries configured from node IDs 511, entity IDs 512, entity types 513, and character strings 514.

The node ID 511 is identification information on each node. The entity ID 512 is identification information on each entity. The entity type 513 is a type of each entity. Any one of "P," "N," and "others" is stored in each entity type 513. "P" represents that the entity indicates a positive value in a knowledge. "N" represents that the entity indicates a negative value in a knowledge. "Others" represents that the entity is neither "P" nor "N." The character string 514 is a character string defined as a node corresponding to the node ID 511 and the entity ID 512.

Note that if a plurality of nodes is organized into one node, a plurality of character strings is stored in the character string 514. Furthermore, even if nodes differ in the node ID 511, the same identification information is set to the entity IDs 512 as long as the nodes are the same or similar in the character string 514.

The relation management data 520 is data that manages the relations and includes entries configured from node IDs 521, relation IDs 522, relation types 523, and character strings 524.

The node ID 521 is identification information on each node. The relation ID 522 is identification information on each relation. The relation type 523 is a type of each relation. Anyone of "promote," "suppress," and "others" is stored in each relation type 523. "Promote" represents that there is a relation that an entity serving as a starting point promotes an entity serving as an endpoint. "Suppress" represents that there is a relation that the entity serving as the starting point suppresses the entity serving as the endpoint. "Others" represents that a relation is neither "promote" nor "suppress." The character string 524 is a character string defined as a node corresponding to the node ID 521 and the relation ID 522.

Note that even if nodes differ in the node ID 521, the same identification information is set to the relation IDs 522 as long as the nodes are the same or similar in the character string 524.

The edge management data 530 is data that manages the edges and includes entries configured from edge IDs 531, edge types 532, source node IDs 533, and target node IDs 534.

The edge ID 531 is identification information on each edge. The edge type 532 is a type of each edge. The source node ID 533 and the target node ID 534 are identification information on the nodes connected by each edge; specifically, the source node ID 533 is identification information on a node that is a connection source and the target node ID 534 is identification information on a node that is a connection destination.

The response generation apparatus 100 searches response candidates using the entity types 513 and the relation types 523 as well as matching of character strings in a case of generating a response to an input, as described later.

The attribute data 600 includes entity attribute management data 610, relation attribute management data 620, and edge attribute management data 630.

The entity attribute management data 610 is data that manages attributes of the entities and includes entries configured from node IDs 611, entity IDs 612, and attributes 613. The node IDs 611 and the entity IDs 612 are the same as the node IDs 511 and the entity IDs 512.

The attributes 613 are information for identifying a condition for making each knowledge hold and acquired from the document data 300 including entities. In the present embodiment, the document ID that is the identification information on the document data 300 which is the knowledge generation source and the sentence ID that is the identification information on each sentence included in the document data 300 are acquired as the attributes.

Note that the aforementioned attributes are given as an example but not exclusively. For example, a year of publication of a document corresponding to the document data 300, a location of publication of the document, a date and a region of a discussion of interest, and the like may be managed as the attributes. For example, a document including a place name in Japan and a Japanese personal name, as knowledges, can be managed as a document having a theme about Japan.

The relation attribute management data 620 is data that manages attributes of the relations and includes entries configured from node IDs 621, relation IDs 622, and attributes 623. The node IDs 621 and the relation IDs 622 are the same as the node IDs 521 and the relation IDs 522.

The attributes 623 are information for identifying a condition for making each knowledge hold and acquired from the document data 300 including nodes. In the present embodiment, the document ID that is the identification information on the document data 300 which is the knowledge generation source and the sentence ID that is the identification information on each sentence included in the document data 300 are acquired as the attributes.

The edge attribute management data 630 is data that manages attributes of the edges and includes entries configured from edge IDs 631, edge types 632, and attributes 633. The edge IDs 631 and the edge types 632 are the same as the edge IDs 531 and the edge types 532.

The attributes 633 are information for identifying a condition for making each knowledge hold and acquired from the document data 300 including nodes. In the present embodiment, the document ID that is the identification information on the document data 300 which is the knowledge generation source and the sentence ID that is the identification information on each sentence included in the document data 300 are acquired as the attributes.

In the present embodiment, the condition for making each knowledge hold is managed as the attributes separately from the graph structure, thereby making it possible to appropriately conduct a matching check with the input document and appropriately select a response to the input document.

Figure 1:
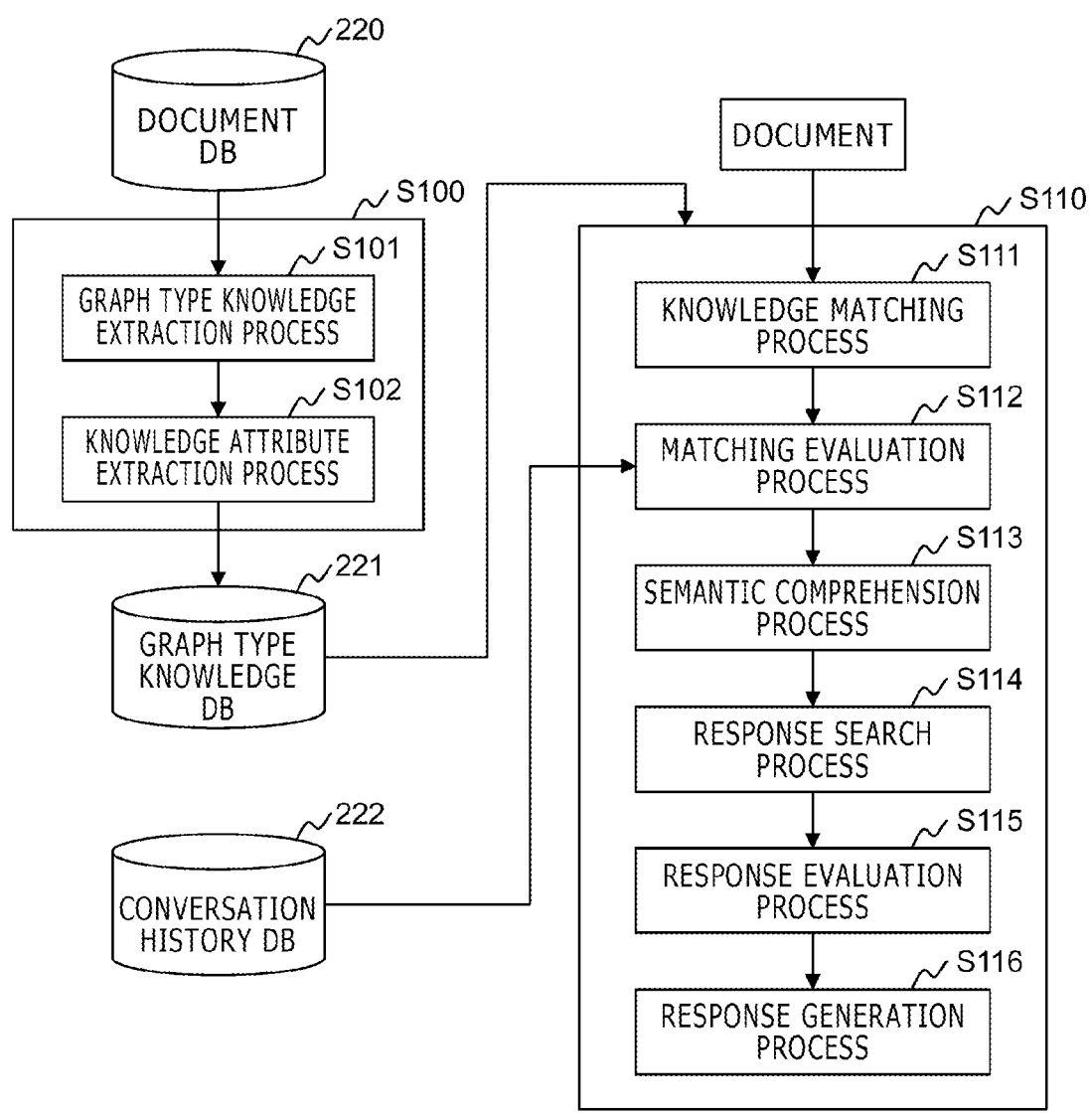
FIG. 1 is a flowchart for illustrating processes executed by a response generation apparatus according to a first embodiment.
Figure 7A:
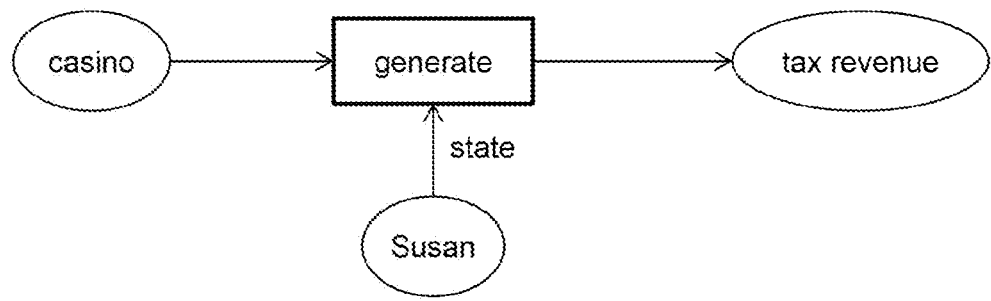
FIGS. 7A to 7C are conceptual diagrams each showing a graph type knowledge generated by a knowledge generation module according to the first embodiment.
Figure 7B:
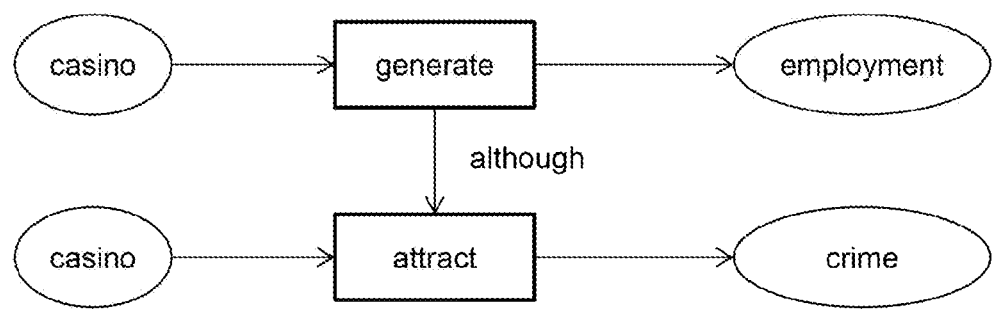
Figure 7C:
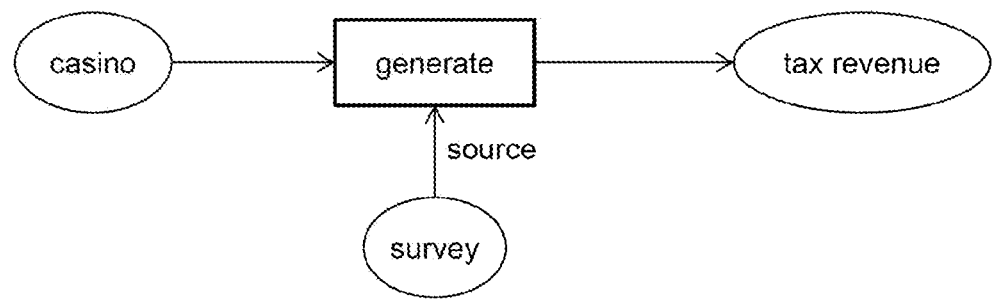

Processes executed by the response generation apparatus 100 will next be described with reference to FIG. 1. FIG. 1 is a flowchart for illustrating the processes executed by the response generation apparatus 100 according to the first embodiment. FIGS. 7A to 7C are conceptual diagrams each showing the graph type knowledge generated by the knowledge generation module 210 according to the first embodiment.

The response generation apparatus 100 executes a process for generating the graph type knowledge DB 221 (step S100) and a response generation process (step S110).

(1) Process for Generating the Graph Type Knowledge DB 221

In the process for generating the graph type knowledge DB 221, the knowledge generation module 210 executes a graph type knowledge extraction process (step S101). The graph type knowledge extraction process will now be described while taking, as an example, the document data 300 shown in FIG. 3.

The knowledge generation module 210 selects one document data 300 and also selects one sentence from among the sentences included in the selected document data 300. The knowledge generation module 210 executes processes (1) and (2) below on the selected sentence.

(1) The knowledge generation module 210 identifies entities from the one sentence. The knowledge generation module 210 registers the identified entities in the entity management data 510.

As a method of identifying the entity, an identifying method using machine learning, for example, might be possible. In this case, the knowledge generation module 210 generates an entity discriminator using a learning document set in which entities to be extracted are labelled, and identifies the entities using the discriminator. As the other example of the identifying method, an identifying method using a syntactic analysis might be possible. Entities are often nouns or adjectives, so that the knowledge generation module 210 identifies nouns and adjectives on the basis of the syntactic analysis. As the syntactic analysis, Standford CoreNLP or the like can be used.

Through the process (1), the knowledge generation module 210 identifies three entities "Susan," "casino," and "tax revenue" from the sentence included in the document data 300-1.

(2) The knowledge generation module 210 identifies a relation between/among the extracted entities. Furthermore, the knowledge generation module 210 generates edges connecting the entities to the relation. The knowledge generation module 210 registers the identified relation in the relation management data 520 and also registers the generated edges in the edge management data 530.

In the case of the document data 300-1, for example, "casino" and "tax revenues" are arguments (a subject and an object) of a predicate "generate." As such, the knowledge generation module 210 identifies, as the relation, the predicate having the two entities as the arguments. Moreover, the knowledge generation module 210 generates the edge between "casino" and "generate" and also generates the edge between "tax revenue" and "generate."

At this time, the predicate "say" connects the entity "Susan" to "casino generate tax revenue"; however, the "casino generate tax revenue" is not an entity. A method of defining "casino generate tax revenue" as one node might be possible; however, this makes the graph structure complicated. The knowledge generation module 210, therefore, deals with the relation "generate" as the relation acting on behalf of "casino generate tax revenue" and connects "Susan" to "generate" by the edge of a type "state."

As a method of identifying relations other than the relation connecting the subject to the predicate, an identifying method using a technique such as Semantic Role Labelling might be possible. In this case, relations to be extracted are defined in advance. For example, relations to be extracted from within FrameNet may be defined or defined independently. In a case of using the relations defined in FrameNet, it is possible to extract the aforementioned relations by using software such as Semafor.

A group configured from two entities and a relation connecting the entities can be also identified using software such as OpenIE. Furthermore, a method of determining the types of the entities and the types of the relations using a dictionary might be possible.

It is assumed that the type of the edge connecting "casino" to "generate" and the edge connecting "tax revenue" to "generate" is link.

Through the processes (1) and (2), the knowledge generation module 210 generates the graph type knowledge as shown in FIG. 7A from the sentence contained in the document data 300-1.

The knowledge generation module 210 executes the same processes on all the sentences included in the selected document data 300-1. Moreover, the knowledge generation module 210 executes the same processes on all the document data 300.

As a consequence, the knowledge generation module 210 generates the graph type knowledge as shown in FIG. 7B from the document data 300-2, and generates the graph type knowledge as shown in FIG. 7C from the document data 300-3. FIG. 7B shows the graph type knowledge such that a group (casino, generate, employment) and a group (casino, attract, crime) are connected by an edge of a type "although." Further, FIG. 7C shows the graph type knowledge such that a group (casino, generate, tax revenue) and "survey" are connected by an edge of a type "source." Note that "they" in the document data 300-2 is linked to "casino" by performing an anaphoric analysis.

Note that the aforementioned method of generating the graph type knowledge is given as an example but not exclusively.

For example, the knowledge generation module 210 might use a method of executing the syntactic analysis and a dependency analysis and identifying arguments of the predicate as the entities. Furthermore, the knowledge generation module 210 may identify the entities using software such as dbpedia_spotlight.

Moreover, the knowledge generation module 210 may generate the graph type knowledge by inferring relations between/among the entities included in different sentences. So far, the graph type knowledge extraction process has been described.

The knowledge generation module 210 then executes a knowledge attribute extraction process (step S102).

In the present embodiment, it is assumed that data extracted as attributes is defined in advance. In this case, the knowledge generation module 210 extracts the defined attributes from one document data 300, and generates the entity attribute management data 610, the relation attribute management data 620, and the edge attribute management data 630.

For example, if metadata and the like of the document data 300 are extracted as attributes, the attributes of the entities, the relations, and the edges included in one document data 300 are registered in the entity attribute management data 610, the relation attribute management data 620, and the edge attribute management data 630. For example, because the same entity "casino" is included in both the document data 300-1 and the document data 300-2, the entity attribute management data 610 shown in FIG. 6 includes the entry managing the attributes of the entity "casino" included in the document data 300-1 and the entry managing the attributes of the entity "casino" included in the document data 300-2.

The knowledge generation module 210 places the nodes having the same or similar character string in the same category, thereby integrating a plurality of graph type knowledges generated from the plurality of items of document data 300. As a result of integration of the nodes of the graph type knowledges shown in FIGS. 7A, 7B, and 7C, the graph type knowledge as shown in FIG. 4 is generated.

The integration of the nodes is based on similarities of the character strings. Nevertheless, there are cases where even the same or similar character strings have different concepts or there are cases where even the different character strings represent the same concept. For example, the entity "casino" possibly represents not only a facility but also a title of a novel or a movie. Furthermore, an entity "Dr. Susan" and an entity "Prof. Susan" represent the same concept.

In the present embodiment, the knowledge generation module 210 allocates the entity ID 512 to each entity apart from the node ID 511 or 521 and also allocates the relation ID 522 to each relation. This allows for generation of accurate knowledges.

For the identification information on the entities, the software such as dbpedia_spotlight or the like might be used. The software dbpedia_spotlight can recognize the entities included in each document and link the entities to the defined identification information on the entities. The same thing is true for the relations; identification information on relational ontologies may be linked to the relations.

Figure 8A:
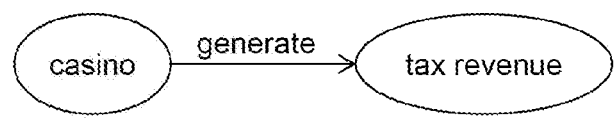
FIGS. 8A to 8C are conceptual diagrams each showing a graph type knowledge generated by the knowledge generation module according to the first embodiment.
Figure 8B:
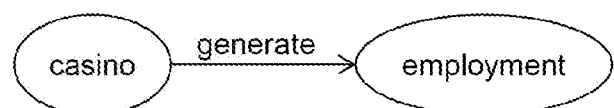
Figure 8B:
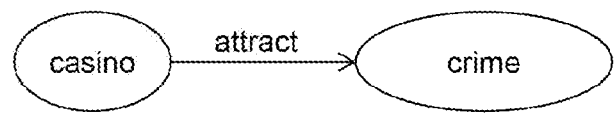
Figure 8C:
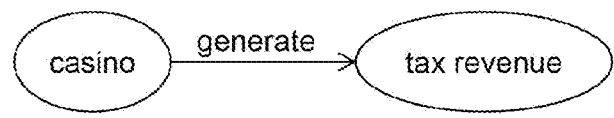
Figure 9:
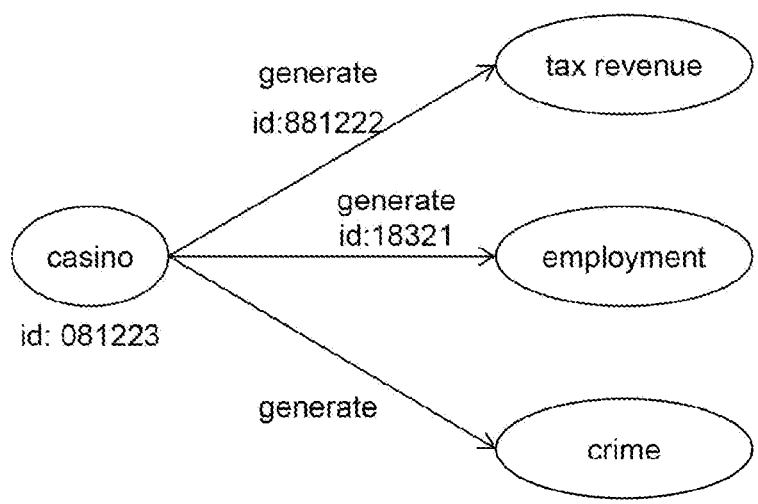
FIG. 9 is a conceptual drawing showing a graph type knowledge stored in the graph type knowledge DB according to the first embodiment.

While the relations are dealt with as the nodes in the graph type knowledges shown in FIGS. 4, 7A, 7B, and 7C, the relations may be dealt with as edges. If the relations are dealt with as the edges, graph type knowledges as shown in FIGS. 8A, 8B, and 8C are generated from the document data 300-1, 300-2, and 300-3, respectively. Moreover, if graphs shown in FIGS. 8A, 8B, and 8C are integrated, a graph type knowledge as shown in FIG. 9 is generated. In regard to the graph type knowledge shown in FIG. 9, the graph data 500 includes the edge management data 530 generated by integrating the relation management data 520 with the edge management data 530. Furthermore, the attribute data 600 includes the edge attribute management data 630 generated by integrating the relation attribute management data 620 with the edge attribute management data 630. That is, the node IDs and the edge IDs are expressed in one column while the relation IDs and the edge type IDs are expressed in one column.

The graph type knowledge shown in FIG. 9 does not include relations of such types as "state," "source," and "although." While knowledge granularity becomes coarse, simplifying the graph structure enables acceleration of the response generation process (in S110). For the brevity of description, it is assumed that graph type knowledges as shown in FIG. 9 are stored in the graph type knowledge DB 221.

(2) Response Generation Process

Figure 10:
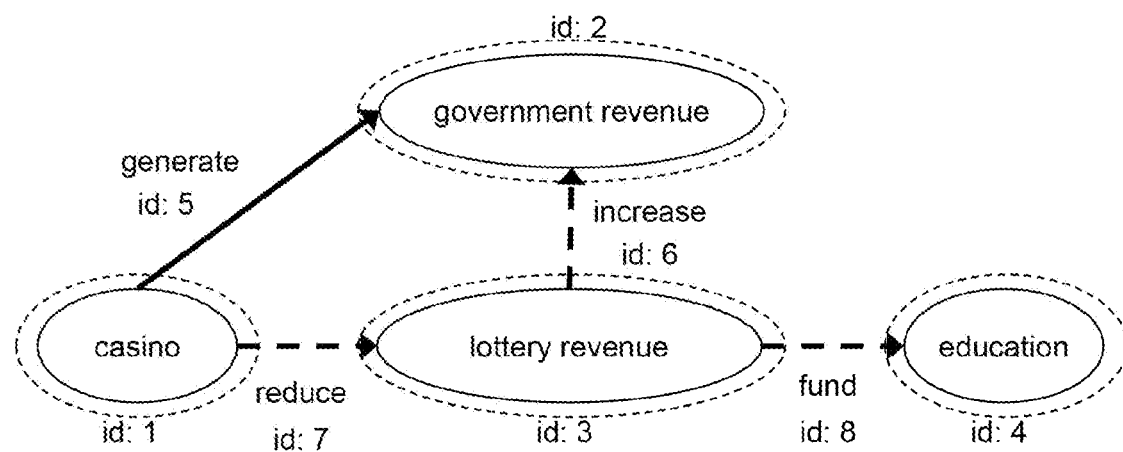
FIG. 10 shows an example of a graph type knowledge included in the graph type knowledge DB for use in a response generation process according to the first embodiment.

The response generation process (step S110) using the graph type knowledge DB 221 will next be described. FIG. 10 shows an example of the graph type knowledge included in the graph type knowledge DB 221 for use in the response generation process according to the first embodiment.

The graph type knowledge shown in FIG. 10 includes four entities (nodes) and four relations (edges) connecting the entities.

The edges denote specific character strings of the relations "generate," "reduce," "increase," and "fund." Furthermore, identification information from 1 to 8 is allocated to the entities and the relations in sequence.

The graph type knowledge shown in FIG. 10 is a graph that represents four knowledges "casino generate government revenue," "casino reduce lottery revenue," "lottery revenue increase government revenue," and "lottery fund education."

As described later, solid line nodes and solid line edges indicate matching portions in an input document while dotted line nodes and dotted line edges indicate candidate responses to the input document.

Upon receiving the input document, the response generation module 211 starts the response generation process (step S110).

First, the response generation module 211 executes a knowledge matching process (step S111). Specifically, the response generation module 211 executes the knowledge matching process as follows.

The response generation module 211 generates a graph type knowledge from each sentence included in the input document using the same method as that used for the process for generating the graph type knowledge DB 221. Each graph type knowledge generated from the input document is also referred to as "input graph type knowledge."

The response generation module 211 conducts a matching check between the input graph type knowledges and the graph type knowledges stored in the graph type knowledge DB 221 to search matching portions in the sentences (graph type knowledges matching with or similar to the input document).

In this example, the response generation module 211 calculates similarities between the group (entity, relation, entity) of each input graph type knowledges and each group (entity, relation, entity) stored in the graph type knowledge DB 221. The response generation module 211 identifies the groups having the similarities equal to or higher than a threshold as matching portions. Note that one or more matching portions are searched for one sentence.

As a group similarity calculation method, a method of calculating individual similarities of the entities and the relations using distances of the entities and relations on an ontology and word2vec, and calculating the similarities of the groups from the former similarities might be used. Note that the group similarity calculation method is not limited to the abovementioned method.

For example, if the sentence is "casino generate government revenue," a part including the solid line entities and connected by the solid line edge is searched as the graph type knowledge corresponding to the input document. In this case, a group (id1, id5, id2) is output as data on the matching portion.

For example, if the sentence is "casino increases tax revenue," then the relation "increase" is similar to the relation "generate," and the entity "tax revenue" is similar to the entity "government revenue." Therefore, if the calculated similarity is higher than the threshold, the group (id1, id5, id2) is output as the data on the matching portion.

In the present embodiment, a similarity threshold is set low such that at least one matching portion can be searched. In this case, the problem that no response is output can be avoided but a problem arises that matching accuracy degrades. However, evaluating the matching portion in a matching evaluation process to be described later can ensure the matching accuracy. Such a processing procedure enables robust matching while keeping high the matching accuracy.

Besides the aforementioned method, the knowledge matching process for estimating a format of the input document and searching a matching portion might be possible. For example, since a topic concerning the casino is discussed in a debate concerning the casino, an input document that does not include the casino as a word is often input. This knowledge matching process is effective to address such a problem.

Specifically, the response generation module 211 estimates the format of the input document using types of the entities and types of the relations. For example, in a case of a sentence positive about the casino, a sentence "casino promote positive value of certain event" or "casino suppress negative value of certain event" might be assumed. As such, the response generation module 211 searches the entity representing the positive value.

Note that the aforementioned two methods may be used in combination. So far, the knowledge matching process has been described.

Next, the response generation module 211 executes the matching evaluation process (step S112). Specifically, the response generation module 211 executes the knowledge matching process as follows.

The response generation module 211 generates a set having matching portions for a plurality of sentences as elements. The response generation module 211 selects one matching portion from among the matching portions included in the set, and calculates a distance between the matching portion on a graph and each of the other matching portions included in the set. Furthermore, the response generation module 211 calculates a total value of the distances. The response generation module 211 executes the same process on all the matching portions.

If selecting a first matching portion in a set including the first matching portion, a second matching portion, and a third matching portion, the response generation module 211 calculates a distance between the first matching portion and the second matching portion and a distance between the first matching portion and the third matching portion.

It is assumed herein that a minimum distance among the distances between the nodes included in one matching portion and the nodes included in the other matching portion is the distance between the two matching portions. In the case of the graph type knowledge shown in FIG. 10, a distance between the node "government revenue" and the node "casino" is calculated at 1 and a distance between the node "education" and the node "casino" at 2.

The response generation module 211 gives 1 to the matching portion having a smallest total value of the distances as a score and gives 0 to the other matching portions as scores. This represents that a density of the matching portions on a graph space identifies a location in the set of the matching portions and a score of the matching portion placed in the location is set to 1. The graph space herein is a space that constitutes the graph type knowledges stored in the graph type knowledge DB 221 and can be recognized as a conceptual image as shown in FIG. 4.

Generally, a distance between knowledges of high relevance is small on the graph. Therefore, it is considered that the knowledges extracted from a plurality of sentences included in the input document are relevant, so that the matching portions placed in the location where the density of the matching portions is high in the graph space can be dealt with as more accurate knowledges.

Now, advantages of the knowledge matching process and the matching evaluation process will be described while taking, as an example, the input document "that promote tourism industry and promote employment. That eventually contribute to revitalizing local economy and improving government revenue."

In the knowledge matching process, the response generation module 211 identifies tourism industry, employment, local economy, and government revenue as the entities representing performance values. Since a topic of interest is unknown, the response generation module 211 uses a provisional entity X and searches matching portions for sentences represented by a group (X, promote, tourism industry), a group (X, promote, employment), a group (X, promote, local economy), and a group (X, promote, government revenue). In the case of a topic concerning the casino, it is considered that knowledges including tourism industry, employment, local economy, and tourism government revenue are closer on the graph.

As such, in the matching evaluation process, the response generation module 211 identifies the matching portion in the input document on the basis of the density of a set of the matching portions in each sentence. In this example, the response generation module 211 outputs (id1, id5, and id2) as the data on the matching portion.

The response generation module 211 can identify a highly accurate matching portion by calculating scores of the matching portions in the input document using the matching portions in a plurality of sentences and identifying the matching portion for a search of a response on the basis of the scores. That is, it is possible to ensure the matching accuracy by reliably outputting the response by robustly searching the matching portions and selecting the matching portion on the basis of the densities of the matching portions in the graph space.

Note that the conversation history DB 222 may be used in the matching evaluation process. Using the conversation history DB 222 enables the highly accurate matching portion to be identified on the basis of the distances of the matching portions in sentences included in the conversation history DB 222 even in a case where the input document includes one sentence. So far, the matching evaluation process has been described.

Next, the response generation module 211 executes a semantic comprehension process (step S113). Specifically, the response generation module 211 deletes the matching portions for which the scores calculated in the matching evaluation process are lower than a threshold from the memory 201. The matching portions stored in the memory 201 are comprehended as the knowledges of the input document.

The response generation module 211 then executes a response search process in order to search knowledges of candidate responses to the matching portion (step S114).

The response generation apparatus 100 according to the present embodiment holds response type information in which types of responses generated in response to the input document are defined. The types of the responses will now be described with reference to FIGS. 11A to 11E. FIGS. 11A to 11E are conceptual diagrams each showing the response type information held by the response generation apparatus 100 according to the first embodiment. Note that the response type information might have the same data format as that of the graph data 500.

A circle including T denotes an entity as a topic of interest, a circle including P denotes an entity the entity type 513 of which is "P," a circle including N denotes an entity the entity type 513 of which is "N," and a circle including S denotes an entity the entity type 513 of which is "others."

Furthermore, an endpoint of each entity is either a black dot or an arrow. The block dot represents that an entity is connected to another entity via a relation the relation type 523 of which is "suppress" while the arrow represents that an entity is connected to another entity via a relation the relation type 523 of which is "promote."

Moreover, a broken line represents a knowledge path corresponding to an input (argument), a thick solid line represents a knowledge path corresponding to a response, and a thin solid line represents an auxiliary knowledge path used for searching the response.

The response generation apparatus 100 holds definition information indicating relationships between the input and the response as shown in FIGS. 11A to 11E. A user selects one relationship between the input and the response in accordance with the type of a desired response.

Figure 11A:
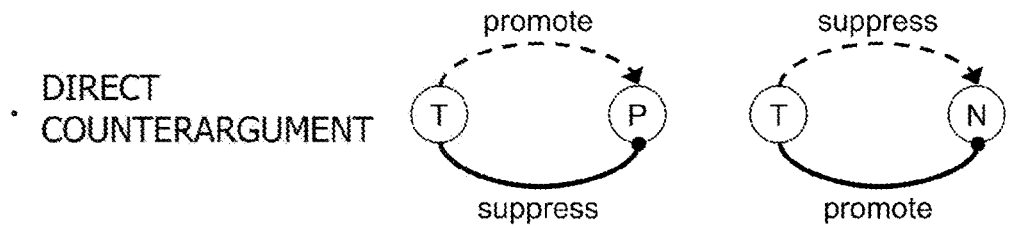
FIGS. 11A to 11E are conceptual diagrams each showing response type information held by the response generation apparatus according to the first embodiment.

FIG. 11A shows the relationship between the input and the response in a direct counterargument. In the direct counterargument, the response generation apparatus 100 searches, as the response, a knowledge indicating an opposite case to a knowledge corresponding to the input.

For example, for an input "casino (T) promote tax revenue (P) (promote)," a response "casino (T) suppress tax revenue (P) (suppress)" is searched.

Figure 11B:
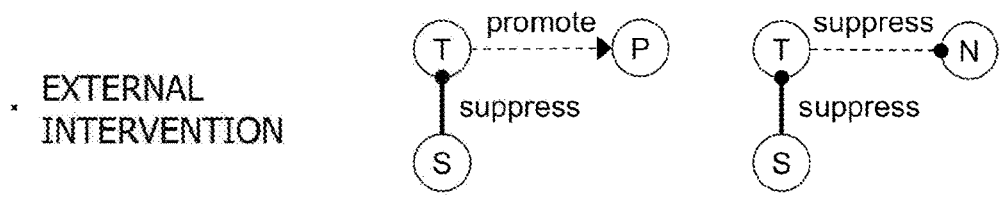

FIG. 11B shows the relationship between the input and the response in an external intervention. In the external intervention, the response generation apparatus 100 searches, as the response, a knowledge indicating a case that intervenes the topic of interest itself in the input.

For example, for the input "casino (T) generate tax revenue (P) (promote)," a response "law (S) prohibit casino (T) (suppress)" is searched.

Figure 11C:
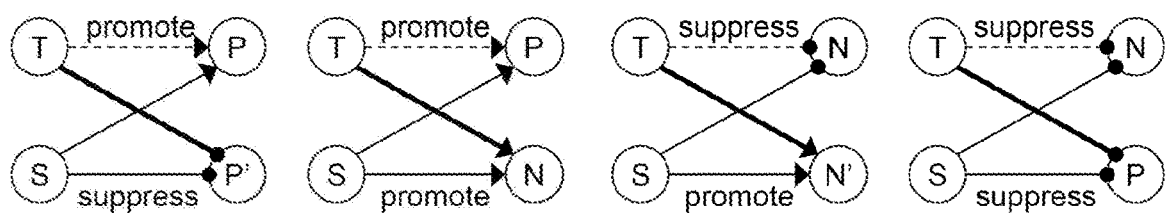

FIG. 11C shows the relationship between the input and the response in a tradeoff. In the tradeoff, the response generation apparatus 100 searches the response from a perspective of a tradeoff between values.

For example, concerning a topic "whether to introduce uniform in school," a counterargument "introducing uniform (T) suppress personality (P') (suppress)" and a counterargument "introducing uniform (T) cause loss of market fairness (P) (suppress)" might be assumed against a knowledge "introducing uniform (T) promote discipline (P) (promote)." There is a tradeoff relationship between the discipline and the personality. The latter counterargument is a knowledge of no relevance to the discipline, so that it is considered that the former knowledge is an appropriate response to the input.

In this way, if a plurality of knowledges having relationships of either promoting the discipline or suppressing the personality in a certain matter (S), the tradeoff relationship is held between the discipline and the personality. Owing to this, in the tradeoff, the response generation apparatus 100 searches a value P' in the tradeoff relationship with a value P and searches a response "T suppress P'" to an input "T promote P."

Figure 11D:
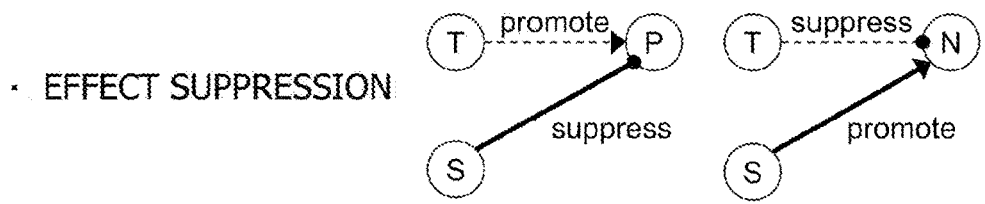

FIG. 11D shows the relationship between the input and the response in an effect suppression. In the effect suppression, the response generation apparatus 100 searches, as the response, a knowledge suppressing an effect exhibited by the input.

For example, for an input "casino (T) generate tax revenue (P) (promote)," a response "revenue decrease of lottery competing against casino reduce tax revenue (P) (suppress)" is searched.

Figure 11E:
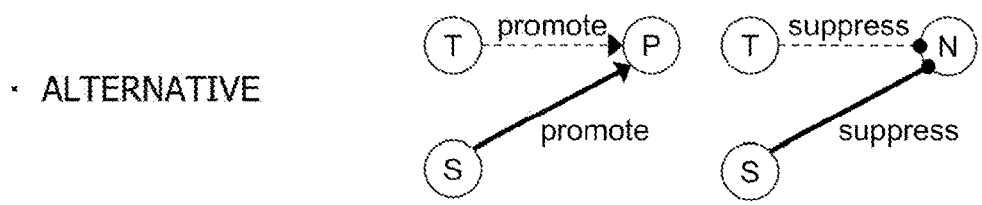

FIG. 11E shows the relationship between the input and the response in an alternative. In the alternative, the response generation apparatus 100 searches, as the response, a knowledge including the same effect as the effect exhibited by the input.

For example, for an input "casino (T) generate employment (P) (promote)," a knowledge corresponding to alternative means "not casino but financing company (T) can generate employment (P) (promote)" is searched. So far, the response types have been described.

A specific processing content of the response search process in a case of selecting the direct counterargument will now be described with reference to FIG. 10.

The matching portion in the input document is the group (id1, id5, id2). Since "government revenue" is the entity representing a positive value and "generate" is the relation of the type promotion, the response generation module 211 searches a knowledge suppressing the "government revenue" from the graph type knowledge DB 221.

On the graph shown in FIG. 10, the knowledge "casino reduce lottery revenue" and the knowledge "lottery revenue increase government revenue" are present, and it is possible to obtain a knowledge that the casino suppresses the government revenue from the two knowledges. Therefore, the response generation module 211 outputs the group (id1, id7, id3, id6, id2) as a knowledge of a candidate response to the matching portion.

While one candidate response is searched in the aforementioned example, a plurality of candidate responses may be searched. So far, the response search process has been described.

Next, the response generation module 211 executes a response evaluation process (step S115).

Specifically, the response generation module 211 calculates a score of the candidate response searched in the response search process. For example, the response generation module 211 calculates, as the score of the candidate response, a total value of a score indicating a strength of a counterargument, a score indicating a level of consistency, and a score of matching.

The score indicating the strength of the counterargument is calculated as the number of entities negative about the input document. In the example shown in FIG. 10, a total value of the number of entities having negative values promoted by the casino and the number of entities having positive values suppressed by the casino is calculated as a first score.

The score indicating the level of consistency is calculated using the attribute data 600. For example, the response generation module 211 refers to values of the attributes 613, 623, and 633 of a plurality of knowledges included in the candidate response, and gives 1 as a score when the values of all the attributes 613, 623, and 633 coincide; otherwise gives 0 as the score.

As the score of matching, the score calculated in the matching evaluation process is used.

In this way, by using the scores based on the attributes indicating a condition making the knowledges hold, it is possible to generate, as the response, the knowledge that holds under an equivalent or corresponding condition to that for the input document.

For example, if "casino reduce lottery revenue" is a knowledge that holds in the US and "lottery revenue fund education" is a knowledge that holds in Japan, a knowledge obtained by combining the two knowledges has low consistency for the input document with a topic concerning the US. So far, the response evaluation process has been described.

Next, the response generation module 211 executes a response generation process for generating a response from the candidate response (step S116).

The response generation module 211 selects a response from among the candidate responses on the basis of the total value or the like of the scores calculated in the response evaluation process. For example, the response generation module 211 selects, as the response, the candidate response for which the total value of the scores is higher than a threshold. Alternatively, if a plurality of responses is present, the response generation module 211 may generate one response by combining the plurality of responses or generate a plurality of responses. The response generation module 211 converts a data format of each response into a predetermined data format and outputs the resultant response to outside.

For example, if selecting (id3, id6, id2), (id1, id7, id3), and (id3, id8, id4) as the responses, the response generation module 211 may generate a response "casino reduce lottery revenue. This possibly reduce government revenue since lottery revenue is government revenue. This also adversely influence education since lottery revenue fund education" by combining the three responses.

According to the present embodiment, at least one graph type knowledge for generating the response is searched since the graph type knowledge is robustly searched. The response generation apparatus 100 can, therefore, always output a response to an input document. Furthermore, the response generation apparatus 100 can generate a response that differs in viewpoints from the input document and that holds in a debate by scoring based on the attribute data 600.

It is to be noted that the present invention is not limited to the abovementioned embodiment but encompasses various modifications. For example, the configurations have been described in detail in the abovementioned embodiment for helping understand the present invention and the present invention is not necessarily limited to a feature provided with all the configurations described above. Furthermore, part of the configurations in the embodiment can be added to other configurations, deleted, or replaced by the other configurations.

Moreover, the configurations, functions, processing units, processing means, and the like described above may be realized by hardware by designing or the like of part of or all of those with, for example, integrated circuits. Furthermore, the present invention can be realized by a program code of software realizing the functions of the embodiment. In this case, a storage medium recording the program code is provided to a computer and a CPU included in the computer reads the program code stored in the storage medium. In this case, the program code read from the storage medium realizes the aforementioned functions of the embodiment per se, and the program code as well as the storage medium storing the program code constitutes the present invention per se. For example, a flexible disk, a CD-ROM, a DVD-ROM, a hard disk, an SSD (Solid State Drive), an optical disk, a magneto optical disk, a CD-R, a magnetic tape, a nonvolatile memory card, a ROM or the like is used as the storage medium for supplying such a program code.

Furthermore, the program code realizing the functions described in the present embodiment can be implemented in a broad range of programming or script languages such as Assembly language, C/C++, perl, Shell, PHP, and Java (registered trademark).

Moreover, by delivering the program code of the software realizing the functions of the embodiment via a network, the program code may be stored in storage means such as a hard disk or a memory of the computer or a storage medium such as a CD-RW or a CD-R and may be executed by causing the CPU provided in the computer to read the program code stored in the storage means or storage medium.

What is claimed is:

1. A computer comprising:
a processor;
a storage device connected to the processor; and
an interface connected to the processor,
the storage device including a graph type knowledge database that stores graph type knowledges each representing a relevance among elements constituting a sentence that defines a knowledge using a node and an edge,
the graph type knowledge database includes graph data that manages a structure of each of the graph type knowledges,
the processor generating a response to an input document including a plurality of sentences using the graph type knowledge database, and
the processor being configured to:
generate a first graph type knowledge from each of the sentences included in the input document;
search a second graph type knowledge similar to each of the plurality of first graph type knowledges while referring to the graph data on the basis of the plurality of first graph type knowledges, and the second graph type knowledges include a plurality of matching portions, each of the plurality of matching portions includes a plurality of the elements;
identify the plurality of second graph type knowledges included in a dense location where a density of the plurality of second graph type knowledges is high in a graph space corresponding to the graph type knowledge database as the second graph type knowledge used to generate the response;
calculate each distance between the plurality of elements in each of the plurality of matching portions in the dense location, for each of the plurality of matching portions calculate a total of the distances;
assign one of the plurality of matching portions with a smallest distance a first score and all of the other plurality of matching portions a second score;
calculate a value based on a plurality of different scores for each of a plurality of candidate responses, the plurality of candidate responses including the plurality of elements in the one of the plurality matching portions assigned the first score;
select one of the plurality of candidate responses having the calculated value above a threshold as the selected response; and
generate the response using the selected candidate response.

2. The computer according to claim 1,
wherein the processor is configured to:
select a second graph type knowledge of interest; and
identify the dense location where the density of the plurality of second graph type knowledges is high in the graph space on the basis of the calculated distances, and wherein the calculated distances are between the node included in the second graph type knowledge of interest and the node included in each of others of the second graph type knowledges.

3. The computer according to claim 2, wherein the processor determines that the second graph type knowledge of interest is placed in the dense location if the calculated distance is smaller than a threshold.

4. The computer according to claim 3, wherein the graph type knowledge database includes attribute data that manages an attribute indicating a condition for making each of the graph type knowledges hold, and the processor is configured to:
calculate the value for each of the candidate response, wherein the plurality of different scores indicate at least consistency, in the condition for making each of the graph type knowledges hold, between each of the identified second graph type knowledges and each of the third graph type knowledges while referring to the attribute data.

5. The computer according to claim 4, the computer holding response type information that defines a type of the response to be output, wherein the processor searches the third graph type knowledges on the basis of the identified second graph type knowledges and the response type information.

6. The computer according to claim 1, wherein the second score is lower than a first score.

7. The computer according to claim 6, wherein the first score is one and the second score is zero.

8. A response generation method in a computer comprising a processor, a storage device connected to the processor, and an interface connected to the processor,
the storage device including a graph type knowledge database that stores graph type knowledges each representing a relevance among elements constituting a sentence that defines a knowledge using a node and an edge, the processor-generates a response to an input document including a plurality of sentences using the graph type knowledge database, the graph type knowledge database including graph data that manages a structure of each of the graph type knowledges, the response generation method comprising:
generating, by the processor, a first graph type knowledge from each of the sentences included in the input document;
searching, by the processor, a second graph type knowledge similar to each of the plurality of first graph type knowledges while referring to the graph data on the basis of the plurality of first graph type knowledges, the second graph type knowledge include a plurality of matching portions, each of the plurality of matching portions includes a plurality of the elements;
identifying, by the processor, the plurality of second graph type knowledges included in a dense location where a density of the plurality of second graph type knowledges is high in a graph space corresponding to the graph type knowledge database as the second graph type knowledge used to generate the response;
calculating, by the processor, each distance between the plurality of elements in each of the plurality of matching portions in the dense location, for each of the plurality of matching portions calculate a total of the distances;
assigning one of the plurality of matching portions with a smallest distance a first score and all of the other plurality of matching Portions a second score;
calculating, by the processor, a value based on a plurality of different scores for each of a plurality of candidate responses, the plurality of candidate responses including the plurality of elements in the one of the plurality of matching portions assigned the first score,
select one of the plurality of candidate responses having the calculated value above a threshold, as the selected response; and
generating, by the processor, the response using the selected candidate response.

9. The response generation method according to claim 8, wherein the method further includes:
selecting, by the processor, a second graph type knowledge of interest; and
identifying, by the processor, the dense location where the density of the plurality of second graph type knowledges is high in the graph space on the basis of the calculated distances, and
wherein the calculated distances are between the node included in the second graph type knowledge of interest and the node included in each of others of the second graph type knowledges.

10. The response generation method according to claim 9, wherein the method further includes determining, by the processor, that the second graph type knowledge of interest is placed in the dense location if the calculated distance is smaller than a threshold.

11. The response generation method according to claim 10, wherein the graph type knowledge database includes attribute data that manages an attribute indicating a condition for making each of the graph type knowledges hold, and the method further includes:
calculating, by the processor, the value for each of the candidate response, wherein the plurality of different scores indicate at least consistency, in the condition for making each of the graph type knowledges hold, between each of the identified second graph type knowledges and each of the third graph type knowledges while referring to the attribute data.

12. The response generation method according to claim 11, wherein the computer holds response type information that defines a type of the response to be output, and the processor searches the third graph type knowledges on the basis of the identified second graph type knowledges and the response type information.

13. The response generation method according to claim 8, wherein the second score is lower than a first score.

14. The response generation method according to claim 13, wherein the first score is one and the second score is zero.

* * * * *